United States Patent [19]

Miller et al.

[11] 3,816,370

[45] June 11, 1974

[54] ACRYLONITRILE POLYMERIZATION METHOD AND PRODUCTS

[75] Inventors: Leonard Edward Miller, Chagrin Falls; Katsumi Hayashi, Mentor, both of Ohio

[73] Assignee: The Lubrizol Corporation, Wickliffe, Ohio

[22] Filed: Mar. 27, 1972

[21] Appl. No.: 238,669

[52] U.S. Cl. .................... 260/79.3 MU, 260/85.5 N
[51] Int. Cl. .......................... C08f 13/00, C08f 1/80
[58] Field of Search .. 260/79.3 MU, 85.5 R, 85.5 N

[56] References Cited
UNITED STATES PATENTS

| | | | |
|---|---|---|---|
| 2,794,015 | 5/1957 | Jackson | 260/79.3 |
| 3,277,064 | 10/1966 | Lovelock | 260/87.1 |
| 3,332,904 | 7/1967 | La Combe | 260/33.2 |
| 3,336,270 | 8/1967 | Monagle | 260/79.3 |
| 3,505,290 | 4/1970 | Mazzolini | 260/63 |
| 3,506,707 | 4/1970 | Miller | 260/513 |
| 3,637,622 | 1/1972 | Lo Monaco | 260/85.5 |

*Primary Examiner*—Joseph L. Schofer
*Assistant Examiner*—C. A. Henderson, Jr.
*Attorney, Agent, or Firm*—James W. Adams, Jr.; William H. Pittman

[57] ABSTRACT

Polymers formed by interpolymerization in an aqueous acidic system of acrylonitrile or methacrylonitrile with sulfonic acid monomers (particularly acrylamidoalkanesulfonic acids and their salts) are improved as to basic dye affinity by carrying out the polymerization in the presence of a minor amount of an amine salt, especially a nitrate or chloride of a mono- or di-(lower alkyl)amine.

4 Claims, No Drawings

ACRYLONITRILE POLYMERIZATION METHOD AND PRODUCTS

This invention relates to a method for making polymeric compositions of matter with improved susceptibility to basic dyes. More particularly, it relates to an improvement in a method for preparing interpolymers by the copolymerization in an aqueous acidic system of at least one of acrylonitrile and methacrylonitrile with at least one other polymerizable unsaturated monomer, at least a portion of said other monomer containing sulfonic acid or sulfonic acid salt groups, said improvement comprising carrying out polymerization in the presence of a minor amount of at least one amine salt.

It is well known in the art that acrylonitrile polymers, widely used for preparing textile fibers, are not readily dyeable because of their relatively non-polar character. It is therefore conventional to incorporate in the acrylonitrile polymer a plurality of units derived from a polar comonomer. Depending on whether the dye to be used in an acidic or basic dye, this copolymer may be basic or acidic, respectively; that is, it may contain cationic or anionic units, respectively.

When the dye to be used is basic, it is frequently advantageous to use as the comonomer a polymerizable compound containing sulfonic acid or sulfonic acid salt groups. While these monomers provide improved results with respect to dyeability, it is frequently difficult to incorporate them in the required amounts in the acrylonitrile polymers.

A principal object of the present invention, therefore, is to provide a method for preparing improved acrylonitrile polymers.

A further method is to provide a method for preparing interpolymers of acrylonitrile with monomers which improve the susceptibility of the polymer to basic dyes.

Another object is to provide a method for improving incorporation of sulfonic acid group-containing monomers in acrylonitrile polymers.

A still further object is to provide improved fiber-forming polymers from an aqueous system.

Other objects will in part be obvious and will in part appear hereinafter.

The principal monomer employed in the polymerization process with which the method of this invention is concerned is at least one of acrylonitrile and methacrylonitrile, and is usually acrylonitrile. The monomer containing sulfonic acid groups may be, for example, ethylenesulfonic acid, 2-propenesulfonic acid, 2-methyl-2-propenesulfonic acid, styrenesulfonic acid, β-sulfoethyl methacrylate, 4-acrylamidobenzenesulfonic acid, 2-acrylamidopropanesulfonic acid or 2-acrylamido-2-methylpropanesulfonic acid, as well as their metal (especially alkali metal) and ammonium salts. The especially preferred sulfonic acids are 2-methyl2-propenesulfonic acid and the acrylamidoalkanesulfonic acids, of which 2-acrylamidopropanesulfonic acid and 2-acrylamido-2-methylpropanesulfonic acid are the most readily available examples. Other monomers which may also be incorporated in the system include vinyl chloride, vinyl bromide, vinylidene chloride, vinyl acetate, methyl acrylate, methyl methacrylate, acrylamide and the like.

The present invention is based on the discovery that the incorporation in minor amounts, less than 10% and preferably 0.5–5% based on the weight of the monomers in the system, of an amine salt in the aqueous polymerization system substantially improves the susceptibility to basic dyes of the acrylonitrile polymer. It is believed that this improvement is primarily due to the increase in uptake of the sulfonic acid group-containing monomer in the polymer. However, it is likely that the amine salt itself contributes in some way to the improved dyeability of the polymer.

The amine salts suitable for use in the method of this invention may be derived from aliphatic, cycloaliphatic, aromatic or heterocyclic amines. They are preferably derived from aliphatic amines, chiefly primary and secondary amines and especially mono- or di-(lower alkyl)amines (the term "lower" referring to radicals containing no more than 7 carbon atoms). The preferred salts of these amines are the nitrates and chlorides.

The method of this invention is illustrated by a procedure in which there is employed a round-bottomed flask fitted with a stirrer, nitrogen inlet and outlet system and four addition funnels. The flask contains 100 ml. of 0.0008 $N$ $H_2SO_4$ and the amine salt. The first addition funnel contains 100 parts by weight of acrylonitrile, the second a solution of 3.4 parts of sodium 2-acrylamido-2-methylpropanesulfonate in 100 parts of 0.0024 $N$ $H_2SO_4$, the third a solution of 2.2 parts of sodium metabisulfite in 100 parts of water, and the fourth a solution of 0.75 part of potassium persulfate in 100 parts of water. The flask is maintained at 50°C. by external heating and is purged with nitrogen, and the contents of the four addition funnels are simultaneously added over a 90-minute period. The temperature of 50°C. is maintained for 15 minutes after addition has ceased, and then the solid copolymer which has formed is washed thoroughly with water and dried in a vacuum oven. The basic dye absorption of the polymer is measured; this figure is equal to the number of grams of Sevron Blue 2G absorbed by 100 grams of the powdered polymer. The results for a number of inorganic salts, as well as for a control sample in which no inorganic salt was used, are given in the following table, in which the column identified as "% by weight" refers to the percentage of amine salt used based on the total monomer weight in the system.

| Identity | Salt % by weight | Basic dye absorption |
|---|---|---|
| Control | — | 33 |
| $CH_3NH_3Cl$ | 3.0 | 47 |
| $(CH_3)_2NH_2Cl$ | 3.0 | 42 |
| $(CH_3)_2NH_2NO_3$ | 7.5 | 45 |
| $(C_2H_5)_2NH_2NO_3$ | 5.5 | 43 |

The polymers prepared by the method of this invention may be converted into dyeable fibers, films and the like by conventional procedures.

What is claimed is:

1. In a method for preparing interpolymers by the copolymerization in an aqueous acidic system of at least one of acrylonitrile and methacrylonitrile with at least one other polymerizable unsaturated monomer, at least a portion of said other monomer containing sulfonic acid or sulfonic acid salt groups, the improvement which comprises carrying out said polymerization in the presence of a minor amount of at least one nitrate or chloride of a mono- or di-(lower alkyl)-amine.

2. A method according to claim 1 wherein the sulfonic acid group-containing monomer is an acrylamidoalkanesulfonic acid or an alkali metal salt thereof.

3. A method according to claim 2 wherein the sulfonic acid group-containing monomer is 2-acrylamido-2-methylpropanesulfonic acid or an alkali metal salt thereof.

4. A method according to claim 1 wherein the sulfonic acid group-containing monomer is 2-methyl-2-propenesulfonic acid or an alkali metal salt thereof.

* * * * *